May 7, 1957  P. E. LEE ET AL  2,791,442
TRANSPORT FOR MOBILE IRRIGATION APPARATUS
Filed Oct. 22, 1954
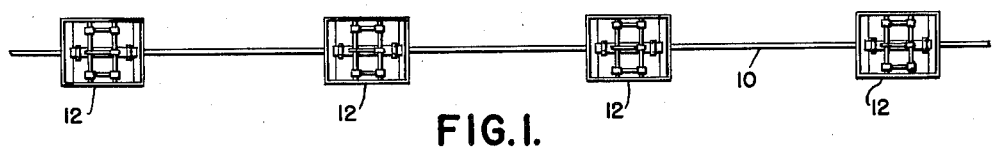
FIG.1.
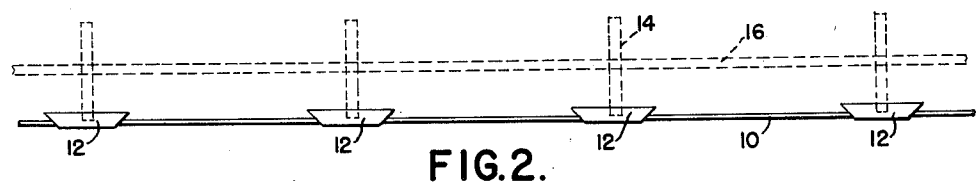
FIG.2.
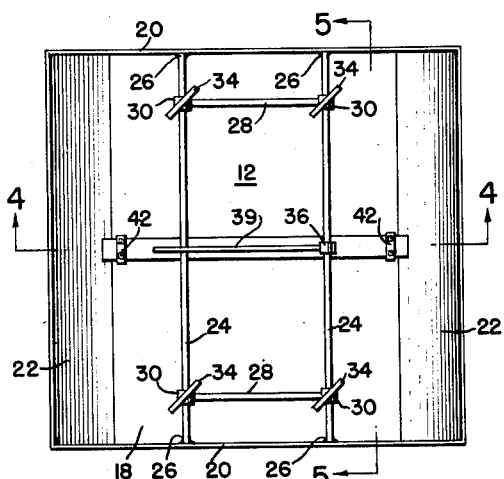
FIG.3.
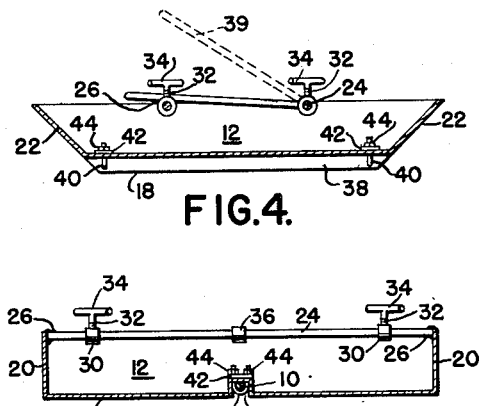
FIG.4.
FIG.5.
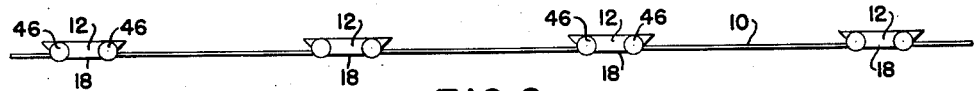
FIG.6.
*INVENTORS*
Pete E. Lee
William D. Hussey
BY
Raymond W. Wooten
*ATTORNEY*

United States Patent Office 2,791,442
Patented May 7, 1957

2,791,442

TRANSPORT FOR MOBILE IRRIGATION APPARATUS

Pete E. Lee, Bakersfield, and William D. Hussey, Carmichael, Calif.

Application October 22, 1954, Serial No. 463,955

10 Claims. (Cl. 280—410)

This invention relates to a transport for mobile irrigation apparatus such as that depicted in the patent to Mansur, No. 2,516,711, dated July 25, 1950.

As wheeled irrigation pipes enjoy more extensive use, the problem of transporting such apparatus from field to field becomes aggravated. It is often necessary to dismantle such irrigation equipment in order to move it, requiring substantial amounts of time and effort.

It is with a view towards relieving such unnecessary effort and delay that the present invention has been evolved.

The transport for mobile irrigation apparatus contemplated by the objects of this invention comprises an elongated drawbar, at least three frames adjustably secured to the drawbar in spaced relationship, each of the frames defining a wheel support having spaced wheel engaging surfaces and a wheel securing member. The elongated drawbar will assume the form of a flexible cable in many applications of this invention and preferably each of the frames comprises a bottom wall and upwardly divergent fore and aft walls disposed transversely of the drawbar axis. Each of these frames may assume the form of a dished unitary shell whose bottom wall defines a channel extending in a fore and aft direction, the channel having a depth exceeding that of the drawbar. Each frame also preferably comprises upwardly directed side walls which together with the bottom wall and end walls define a wheel well. The wheel engaging surfaces are preferably relatively adjustable, adapting the apparatus for use with equipment having wheels of different sizes.

The frames preferably include a pair of rods disposed transversely of the drawbar axis and a pair of members slidably supported on the rods defining the wheel engaging surfaces. Such slidably supported members may be clamped in any adjusted positions along the rods. Whereas it is contemplated for most applications that the frames be dragged along the ground, certain specific applications will include the use of wheels for engagement with the ground.

A more complete understanding of the invention will follow from a detailed description of the accompanying drawing wherein:

Fig. 1 is a plan view of a transport comprising four frames;

Fig. 2 is an elevation of the transport depicted in Fig. 1, depicting in broken lines the manner in which mobile irrigation apparatus will be supported thereby for movement;

Fig. 3 is a plan view on an enlarged scale of one of the frames of Fig. 1;

Fig. 4 is a sectional elevation taken along line 4—4 of Fig. 3;

Fig. 5 is a sectional elevation taken along line 5—5 of Fig. 3; and

Fig. 6 is an elevation depicting a wheeled modification.

A drawbar 10, is preferably an elongated flexible cable, but can on occasion assume the form of a rod or pipe.

At spaced intervals along this drawbar, frames 12 are secured at positions corresponding with the number and spacing of wheels 14 of the mobile irrigation apparatus 16 depicted in broken lines in Fig. 2.

Each of the frames 12 comprises a bottom wall 18, vertical side walls 20 and upwardly divergent fore and aft walls 22 disposed transversely of the axis of the drawbar 10. As shown, the bottom, side and fore and aft walls are defined by a unitary shell and assume the general contour of a dished receptacle.

Each frame also includes a pair of rods 24 disposed transversely thereof and having their ends secured to the upper portions of the opposed side walls 20 by means of welds 26. Slidably mounted on each pair of rods 24 are a pair of wheel engaging members 28 having terminal collars 30 which receive the rods 24. Each of the collars 30 is provided with a threaded set screw 32 terminating in a T-handle 34 for securing these wheel engaging members in the adjusted positions required to suit the dimensions of the wheels of various equipments to be handled.

One of the rods 24 also receives a collar 36 secured to a locking bar 38 designed to swing between the spokes of a wheel of the mobile irrigation apparatus so as to secure against movement relative to the frame during transporting operations.

The bottom wall 18 of each frame contains a downwardly opening channel 38 extending medially thereof in a fore and aft direction for reception of the drawbar 10, the depth of the channel exceeding that of the drawbar as clearly depicted in Fig. 5 so that a minimum resistance to movement along the ground and a minimum of wear on the drawbar itself will be experienced during transporting movements. The drawbar 10 is secured to the frames by means of U-bolts 40 whose legs extend upwardly through openings in the web of the channel 38, through clamping bars 42 to receive nuts 44.

The vehicle train depicted in Fig. 6 corresponds with that of Fig. 2 except for the addition of wheels 46 whose tread surfaces extend slightly below the bottom walls 18 of the frames for use under special circumstances and surface conditions.

In operation, with the transport in position so that its frames 12 will correspond with the relative positions of the wheels 14 of mobile irrigation apparatus to be transported, the mobile irrigation apparatus will be rolled over the side walls 20 of the frames and one of the slidable members 28 of each of the frames until its wheels assume positions between the rods 24 and the slidable members 28. Then the slidable members 28 will be adjusted for engagement with the tires of the wheels and clamped against them by means of their set screws 32. With the wheels thus positioned on the frames, the locking bars 39 will be swung around their rods 24 to secure the wheels against accidental movement relative to the frames during the transporting operation. Then, a suitable tractor will be secured to one end or the other of the drawbar to impart to the transport and its load movement generally along the axis of the drawbar. Inasmuch as both fore and aft walls 22 are inclined upwardly and outwardly, it will follow that the frames are adapted for towing in either axial direction.

Whereas only two forms of the invention have been described with reference to the accompanying drawing, the invention should not be restricted thereto beyond the scope of the appended claims.

We claim:

1. A transport for mobile irrigation apparatus comprising an elongated drawbar, at least three frames adjustably secured to said drawbar in spaced relationship, each of said frames defining a wheel support having spaced wheel engaging surfaces mounted on said frame and adjustable transversely with respect to said drawbar and a wheel securing member movably mounted on said frame.

2. A transport as set forth in claim 1 wherein said drawbar is a flexible cable.

3. A transport as set forth in claim 1 wherein each of said frames comprises a bottom wall and upwardly divergent fore and aft walls disposed transversely of said drawbar.

4. A transport as set forth in claim 1 wherein each of said frames is a dished unitary shell.

5. A transport as set forth in claim 1 wherein each of said frames has upwardly directed side and end walls defining a wheel well.

6. A transport as set forth in claim 1 wherein said wheel engaging surfaces are relatively adjustable.

7. A transport as set forth in claim 1 wherein said frames are supported on wheels.

8. A transport for mobile irrigation apparatus comprising an elongated drawbar, at least three frames adjustably secured to said drawbar in spaced relationship, each of said frames defining a wheel support having spaced wheel engaging surfaces, a wheel securing member and a bottom wall defining a channel extending in a fore and aft direction, said channel receiving said drawbar and having a depth exceeding that of said drawbar.

9. A transport for mobile irrigation apparatus comprising an elongated drawbar, at least three frames adjustably secured to said drawbar in spaced relationship, each of said frames defining a wheel support including a pair of rods secured thereto and disposed transversely of said drawbar and a pair of members slidably supported on said rods defining spaced wheel engaging surfaces, and a wheel securing member.

10. A transport as set forth in claim 9 wherein said slidably supported members carry clamping elements for securing them in adjusted positions on said rods.

References Cited in the file of this patent

UNITED STATES PATENTS

| | | |
|---|---|---|
| 736,439 | Phillips | Aug. 18, 1903 |
| 872,490 | Williamson et al. | Dec. 3, 1907 |
| 1,453,722 | Nuoffer | May 1, 1923 |
| 1,544,965 | Bavousett | July 7, 1925 |
| 2,237,471 | Billings | Apr. 8, 1941 |
| 2,516,711 | Mansur | July 25, 1950 |
| 2,678,844 | Hondeville | May 18, 1954 |

FOREIGN PATENTS

| | | |
|---|---|---|
| 486,262 | Canada | Sept. 9, 1952 |